Sept. 2, 1958  L. S. SUOZZO ET AL  2,850,253
CONSTANT SUPPORT DEVICE
Filed July 20, 1953  3 Sheets-Sheet 1
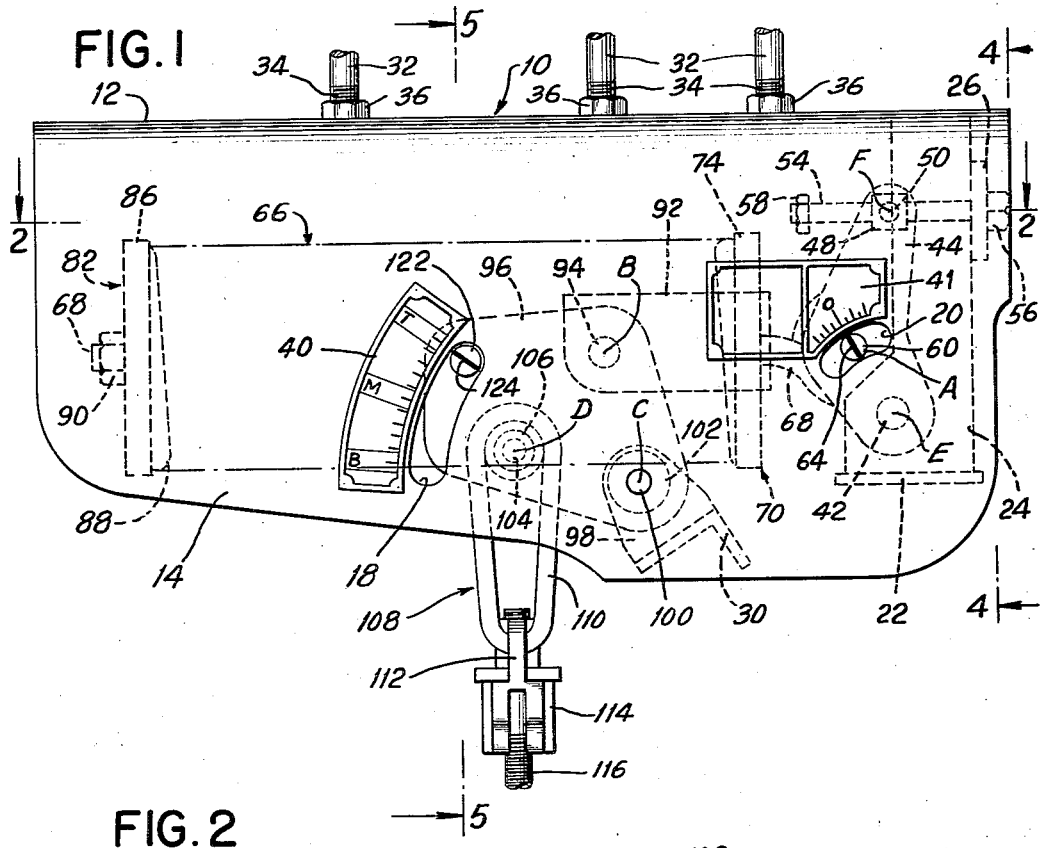
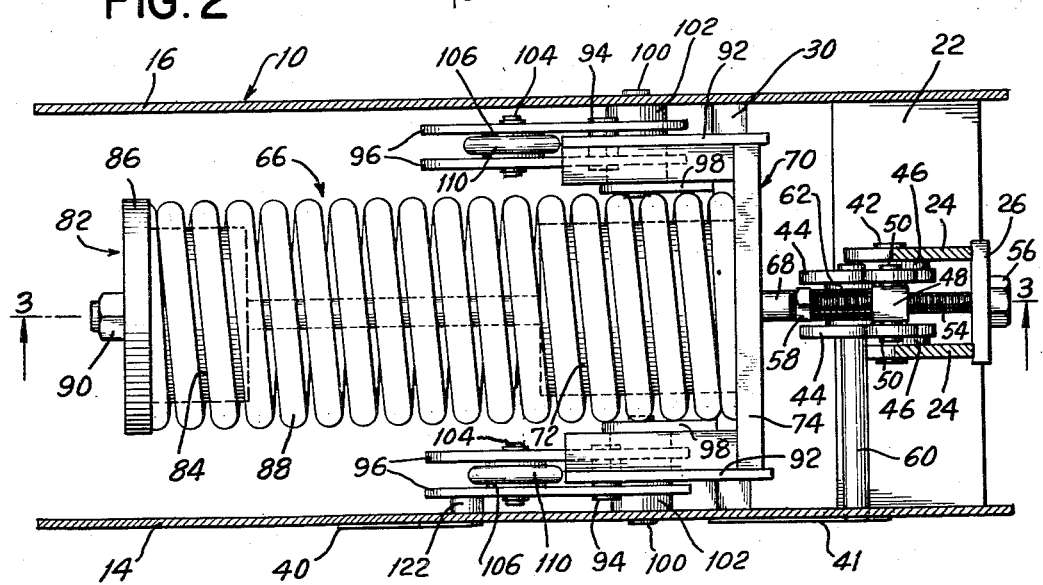

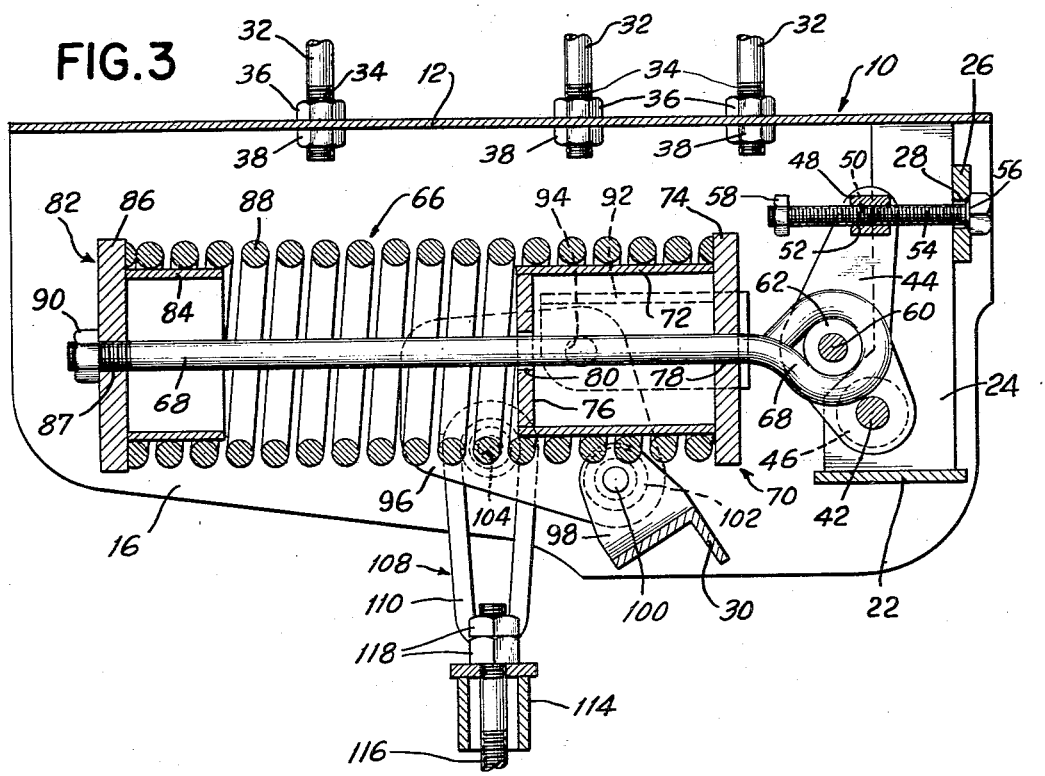
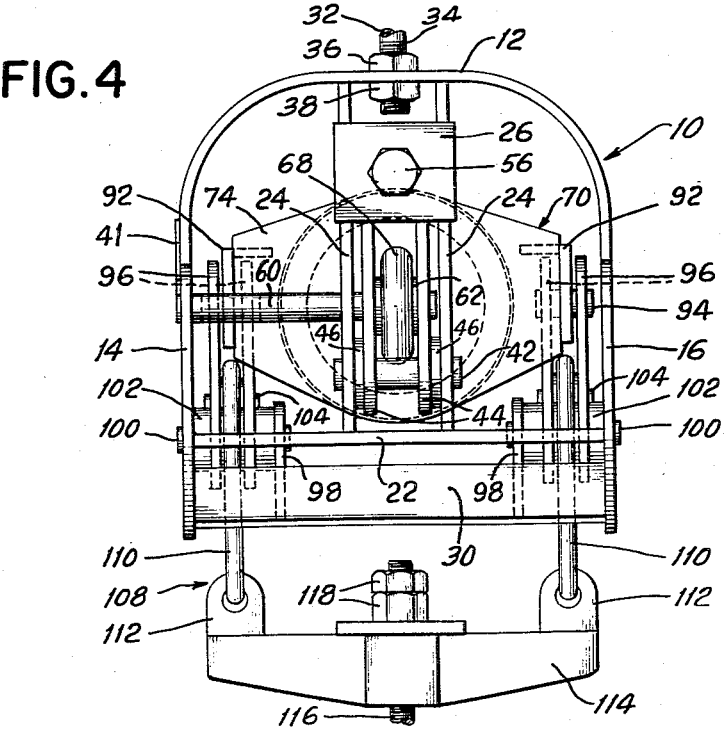

Sept. 2, 1958 L. S. SUOZZO ET AL 2,850,253
CONSTANT SUPPORT DEVICE
Filed July 20, 1953 3 Sheets-Sheet 3

United States Patent Office 2,850,253
Patented Sept. 2, 1958

2,850,253
CONSTANT SUPPORT DEVICE

Leonard S. Suozzo, Hackensack, and John Kohler, Delawanna, N. J., assignors to Bergen Pipesupport Corporation, New York, N. Y., a corporation of New York Application July 20, 1953, Serial No. 369,176

8 Claims. (Cl. 248—54)

This invention relates to a support for various types of loads, including pipes or the like, and more particularly to a spring-loaded constant support that is adapted to permit movement of a suspended load along the line of pull of such a load and simultaneously subject the load to a substantially constant supporting force.

The invention has a variety of uses. It is particularly useful in power plants and similar locales, for supporting pipe arrangements while permitting movement of the pipes as a result of expansion or contraction thereof due to temperature changes in the material of the pipes.

Although a number of advances have been made in recent years in the field of constant support devices, such advances, for the most part, have not been generally accepted due to inherent weaknesses and limitations in design and construction. Among the few worthwhile developments in the field of constant support devices, are those disclosed in John Kohler Patent No. 2,618,449, dated November 18, 1952, and entitled, "Support Device for Pipes or the Like," and in Leonard S. Suozzo pending application Serial No. 312,236, filed September 30, 1952, now abandoned, and entitled "Constant Support Device." The instant invention is an improvement over the devices disclosed in the above identified Kohler patent and Suozzo application.

The primary object of the invention is to provide a constant support device for pipes and the like, embodying improved features of construction.

Another object of the invention is to provide a constant support device that is capable of being readily adjusted to carry loads substantially greater, or less, than its rated capacity.

The invention has for another object the provision of a device of the character indicated that may be readily installed alone, or in tandem with like devices, and coupled to the load to be carried thereby in locations where vertical spaced is restricted.

A further object of the invention is to provide a constant support device that is simple and compact in design; that is sturdy in construction; that is reasonable in manufacturing cost; and that has its parts so constructed and arranged as to permit of ready assembly, adjusting and installation for active use.

The invention has for a still further object the provision of a constant support device that is adapted to perform its intended functions in an entirely satisfactory manner.

With the foregoing objects, as well as other objects in view, one preferred and recommended device constructed in accordance with this invention comprises a unitary frame including an inverted, generally U-shaped shell having a pair of spaced-apart parallel side walls which merge with a top wall or web. The frame has a pair of arcuate slots formed in one of its side walls. Positioned within the frame is an upstanding bell lever connected at its lower end to the frame for pivotal movement in respect thereto. Means is provided for adjustably maintaining the lever in a selected angular position relative to the frame, whereby the apparatus may be readily adjusted to carry loads that may be greater or less than its rated capacity, as will be apparent from the detailed description appearing further along herein. This means comprises a connector, such as a bolt, that forms a swivel connection with the frame and is coupled to and movable with respect to the lever about a second pivotal axis through the medium of a block that threadedly engages the bolt.

Also positioned within the frame is a spring mechanism that includes a member, such as an eyebolt, which is connected to the lever and movable with respect thereto about a third pivotal axis that is parallel to the first pivoted axis. A pair of spring guides, consisting of a first guide and a second guide, is carried by and slidable along the eyebolt. The first guide is located intermediate the second guide and the third pivotal axis. The guides are spaced apart and engage opposite ends of a helical compression spring that is coaxial with the eyebolt and is positioned between the guides. The loading on the spring is normally adjusted by means of a nut carried by the eyebolt and bearing against the second guide.

A device comprising a rigid plate assembly is positioned between the sides of the frame and is movable with respect thereto about a fourth pivotal axis. The device is also connected and movable with respect to the first guide about a fifth pivotal axis.

Coupled to the device for pivotal movement about a sixth pivotal axis is a unit or means for connecting the apparatus to the load to be suspended therefrom. The relative position of various of the above identified pivotal axes is shown in the drawings, and will be described in the detailed description that follows.

The above described form of the invention contemplates mounting the apparatus by suitable connectors that are secured to the top wall or web of the frame. When so mounted, the eyebolt and compression spring of the spring mechanism are arranged generally horizontally.

Another form of the invention contemplates mounting the apparatus thereof in a manner that the eyebolt and compression spring of the spring mechanism are disposed generally vertically, as will be discussed further along herein.

The objects of the invention, together with the advantages obtainable by the use of the apparatus of this invention, will be readily understood by persons skilled in the art upon reference to the following detailed description taken in conjunction with the accompanying drawings, which, respectively, describe and illustrate apparatus embodying the invention.

In the drawings:

Fig. 1 is a view in side elevation of a constant support device constructed in accordance with the invention;

Fig. 2 is a view taken along 2—2 of Fig. 1;

Fig. 3 is a view taken along line 3—3 of Fig. 2;

Fig. 4 is a view taken along line 4—4 of Fig. 1;

Figure 5:
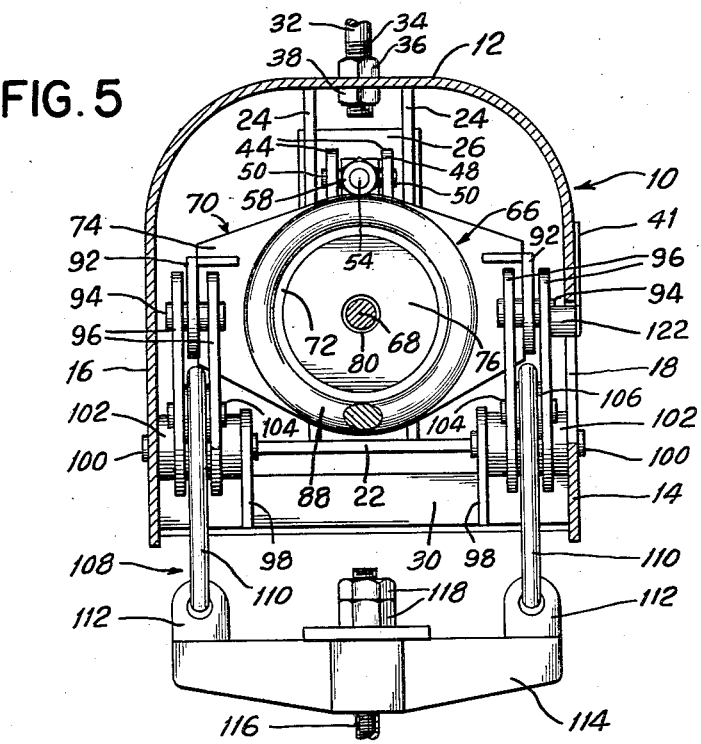
Fig. 5 is a view taken along line 5—5 of Fig. 1.

Referring to the drawings wherein like reference numerals denote corresponding parts throughout the several views, an inverted generally U-shaped frame 10 comprises a top wall or web 12 and spaced-apart parallel side walls 14 and 16. Side wall 14 is formed with arcuate slots 18 and 20, best shown in Fig. 1. The frame also includes a horizontal stretcher 22, a pair of spaced vertical members 24, a backing plate 26 having a central opening 28 (Fig. 3), and an angle bar 30. The above identified parts of the frame, namely top wall 12, sides 14 and 16, stretcher 22, vertical members 24, backing plate 26 and angle bar 30, are arranged, as shown, and joined together, preferably by welding, to obtain a rigid unitary frame structure.

A series of connectors 32 is mounted on the frame. As shown in Fig. 3, each connector has a threaded lower end portion 34 that extends downwardly through frame top wall 12, and is affixed thereto by nuts 36 and 38. Connectors 32 constitute a means for suspending the frame from a support, such as a beam or the like (not shown).

Plates 40 and 41 are affixed in abutting relation to the outer face of wall 14 (Fig. 1). Plate 40 is located adjacent slot 18, while plate 41 is located adjacent slot 20. These plates are graduated as shown, for purposes that will be explained further along herein.

A stationary first shaft 42 is supported at its ends by vertical members 24 (Figs. 2, 3 and 4). A pair of parallel bell levers 44 is supported by and pivotal about the axis of shaft 42 and is spaced from vertical members 24 by spacing rings 46. A block 48 carries a pair of coaxial pins 50 that form pivotal connections with corresponding bell levers 44. The block has a central through tap 52 which is normal to the axis of pins 50 for engagement with a threaded rod or bolt 54. This rod extends through opening 28 in plate 26 and has a rounded head 56 which forms a swivel connection with plate 26. The rod carries a retaining nut 58. It will be apparent from an examination of Fig. 3 that by actuating head 56, rod 54 may be rotated, as desired, to move block 48 therealong and effect corresponding pivotal movement of bell levers 44 about the axis of shaft 42.

A stationary second shaft 60 extends through bell levers 44 intermediate of shaft 42 and pins 50. A combined bearing and spacing sleeve 62 is mounted on shaft 60 between the bell levers. One end of shaft 60 registers with slot 20 and has a score line 64 at its free extremity (Fig. 1) which, together with the graduations appearing on plate 41, denote the extent of travel of loads carried by the apparatus.

Numeral 66 generally indicates a spring mechanism that includes a member, such as an eyebolt 68, which is mounted on bearing 62 and is pivotal about the axis of shaft 60. The eyebolt carries a pair of hollow spring guides, namely a first guide 70 and a second guide 82. The first spring guide consists of a tubular wall 72, a rear end wall or spring plate 74, and a front end wall 76. The end walls of this spring guide are provided with aligned openings 78 and 80.

Second guide 82 consists of a tubular wall 84 and a front end wall or spring plate 86 having a central opening 87. As is best shown in Fig. 3, eyebolt 68 extends through openings 78, 80 and 87 in the guides. A helical compressing spring 88 is coaxial with the eyebolt and bears at its opposite ends against spring plates 74 and 86. A nut 90 engages the threaded end of the eyebolt and bears against plate 86 of guide 82. This nut, in addition to maintaining the guides 70 and 82 and spring 88 on the eyebolt, serves as a means for varying or adjusting the loading on spring 88, as required. It will be noted from an examination of Fig. 3 that guide 82 may be moved toward or away from guide 70 by turning nut 90, thereby correspondingly varying the loading on the spring, assuming, of course, that guide 70 is restrained against sliding movement along the eyebolt.

A pair of parallel arms 92 is secured to and projects forwardly of spring plate 74. These arms are positioned to opposite sides of spring 88, as best shown in Fig. 2. Each arm 92 has a pin 94 proximate its free end. Pins 94 are coaxial. There is provided a pair of levers 96 for each arm 92.

Each pair of levers 96 is pivotally connected to the frame as will now be described, having reference particularly to Figs. 3 and 4. In this connection angle bar 30 is equipped with a pair of support arms 98. Coaxial shafts 100 are supported at their ends by a corresponding support arm 98 and a side wall of the frame. It will be noted from an examination of Fig. 4 that one shaft 100 is supported by frame side wall 14 and an arm 98, while the other shaft 100 is supported by frame side wall 16 and the other arm 98. Each shaft 100 carries a bearing 102 on which a corresponding pair of levers 96 is mounted for pivotal movement about the common axis of shafts 100.

Levers 96 may be considered as constituting a device that is connected to the frame for pivotal movement about the coincident axes of shafts 100. Each pair of levers 96 supports a pin 104 which carries a bearing 106 that also serves to maintain corresponding pairs of levers 96 in illustrated spaced relation. Pins 104 are coaxial.

A load carrying unit or means 108 is connected to levers 96 and is pivotal about the coincident axes of pins 104. This means comprises a pair of links 110 that engage bearings 106. The lower end of each link engages an ear 112 of a yoke 114. The yoke is adapted to be joined to the load to be supported by the apparatus by a suitable connector, such as a bolt 116, that is maintained on the yoke by nuts 118.

Lever 96 that is next adjacent to frame side wall 14 carries a pin 122 that registers with slot 18. This pin limits pivotal movement of levers 96 and spring mechanism 66 about their corresponding pivotal axes as allowed by the extremities of slot 18. Pin 122 has a score line 124 at its free end, which, in association with the graduations appearing on plate 40, indicates the extent of travel of loads carried by the apparatus.

For the purpose of briefly outlining the operation of the above descirbed embodiment of our invention, it is first assumed that the apparatus has been assembled and the parts are in the relative position shown in Figs. 1 to 5. With the parts so arranged, the apparatus is set up to support the normal load for which it is designed, as score line 64 on shaft 60 is in alignment with "0" graduation on plate 41. The apparatus is secured to a support by means of connectors 32 and the load is then connected to unit 108. The load may consist of a series of pipes that transmit a high temperature fluid. The parts are so constructed and arranged that the apparatus affords a substantially constant lifting support for the pipes, while permitting the pipes to move upwardly or downwardly as a result of expansion or contraction due to variations in the temperature in the material of the pipes.

The balancing effect obtained by the apparatus will be readily understood by persons skilled in the art upon reference to Fig. 1 wherein A denotes the axis of shaft 60, which is the pivotal axis of eyebolt 68 with respect to levers 44; B denotes the common axis of pins 94, which is the pivotal axis of levers 96 with respect to arms 92; C denotes the axis of shaft 100, which is the pivotal axis of levers 96 with respect to the frame; D denotes the common axis of pins 104, which is the pivotal axis of load carrying unit 108 with respect to levers 96; E denotes the axis of shaft 42, which is the pivotal axis of bell levers 44 with respect to the frame; and F denotes the common axis of pins 50, which is the pivotal axis of bell levers 44 with respect to swivel rod 54.

Figure 6:
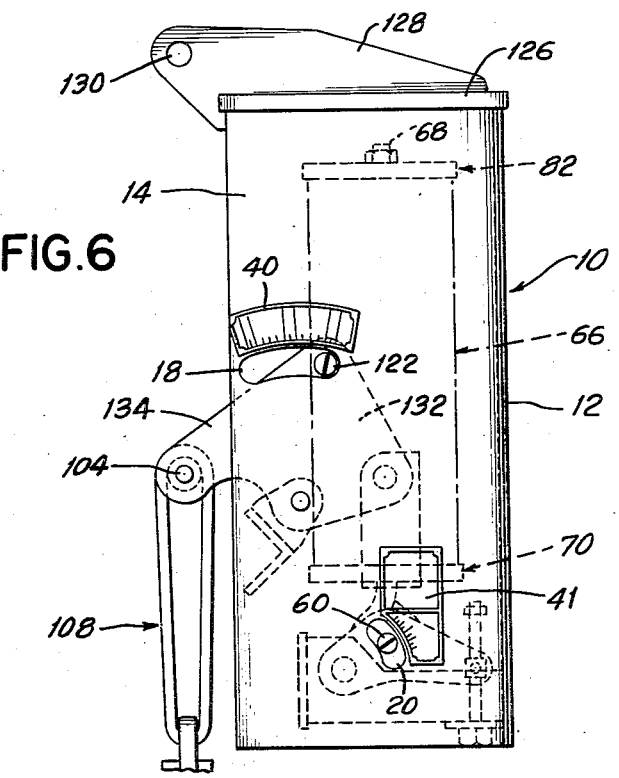
Fig. 6 is a view corresponding to Fig. 1 and illustrating a modified from of construction.

The modification of the invention shown in Fig. 6 is the same in most respects as the form of invention shown in Figs. 1 through 5. In Fig. 6 the parts are so constructed and arranged as to enable the apparatus to be suspended from one end rather than from the top, as in the case of the earlier described form of the invention. To this end, a plate 126 is affixed preferably by welding to the end of frame 10 adjacent the free end of eyebolt 68. Plate 126 carries an arm 128 having an opening 130 for engaging a suitable connector whereby the apparatus is attached to a support, such as a beam. Levers 132 (only one of which is shown) correspond to levers 96 of Figs. 1 to 5. These levers have extensions 134 that carry pins 104 for effecting pivotal connection to load carrying unit 108, earlier described.

From the foregoing, it will be seen that the axis E, a first pivotal axis, is the axis of shaft 42 that connects levers 44 to frame 10; the axis F, a second pivotal axis, is the common axis of pins 50 that connect block 40 to levers 44; the axis A, a third pivotal axis, is the axis of shaft 60 that connects eyebolt 68 to levers 44; the axis C, a fourth pivotal axis, is the common axis of shafts 100 that pivotally connect levers 96 to frame 10; the axis B, a fifth pivotal axis, is the common axis of pins 94 that connect levers 96 to arms 92; and pins 104 that connect levers 96 to the load-carrying unit 108 form a sixth pivotal axis.

The operation of the modification shown in Fig. 6 is basically the same as that of Figs. 1 through 5.

From the foregoing, it is believed that the construction, operation and advantages of our present invention will be readily comprehended by persons skilled in the art. It is to be clearly understood, however, that various changes in the apparatus set forth above may be made without departing from the scope of the invention, it being intended that all matter contained in the description or shown in the drawings shall be interpreted as illustrative only and not in a limiting sense.

We claim:

1. In apparatus of the character described, a frame, a lever, pivot means connecting the lever to the frame and constituting a first pivotal axis, means for adjustably maintaining the lever in a selected angular position relative to the frame and comprising a connector engaging and tiltable with respect to the frame, pivot means connecting the connector to the lever and constituting a second pivotal axis, said last mentioned pivotal means including means for varying the effective length of the connector, a spring mechanism comprising a member, pivot means connecting the member to the lever and constituting a third pivotal axis and a spring carried by the member, a second lever, pivot means connecting the second lever to the frame and constituting a fourth pivotal axis, and pivot means connecting the second lever to the spring mechanism and constituting a fifth pivotal axis, all of said pivotal axes being parallel.

2. In apparatus of the character described, a frame, a lever, pivot means connecting the lever to the frame and constituting a first pivotal axis, means for adjustably maintaining the lever in a selected angular position relative to the frame and comprising a rod that is swivelly connected to the frame, pivot means connecting the rod to the lever and constituting a second pivotal axis, said last mentioned pivotal means including means for varying the effective length of the connector, a spring mechanism comprising a member, pivot means connecting the member to the lever and constituting a third pivotal axis and a spring carried by the member, a second lever, pivot means connecting the second lever to the frame and constituting a fourth pivotal axis, and pivot means connecting the second lever to the spring mechanism and constituting a fifth pivotal axis, all of said pivotal axes being parallel.

3. In apparatus of the character described, a frame, a lever, pivot means connecting the lever to the frame and constituting a first pivotal axis, means for adjustably maintaining the lever in a selected angular position relative to the frame and comprising a rod engaging and tiltable with respect to the frame, an element carried by and movable along the rod for varying the effective length of the rod, pivot means connecting the element to the lever and constituting a second pivotal axis, a spring mechanism comprising a member, pivot means connecting the member to the lever and constituting a third pivotal axis and a spring carried by the member, a second lever, pivot means connecting the second lever to the frame and constituting a fourth pivotal axis, and pivot means connecting the second lever to the spring mechanism and constituting a fifth pivotal axis, all of said pivotal axes being parallel.

4. In apparatus of the character described, a frame, a lever, pivot means connecting the lever to the frame and constituting a first pivotal axis, means for adjustably maintaining the lever in a selected angular position relative to the frame and comprising a rod including a first part that engages and forms a swivel connection with the frame and a threaded second part, and a block threadedly engaging the rod second part, pivot means connecting the block to the lever and constituting a second pivotal axis, a spring mechanism comprising a member, pivot means connecting the member to the lever and constituting a third pivotal axis and a spring carried by the member, a second lever, pivot means connecting the second lever to the frame and constituting a fourth pivotal axis, and pivot means connecting the second lever to the spring mechanism and constituting a fifth pivotal axis, all of said pivotal axes being parallel.

5. Apparatus according to claim 4 wherein the third pivotal axis is intermediate the first and second pivotal axes.

6. Apparatus according to claim 4 including load-carrying means and pivot means connecting the load-carrying means to the second lever and constituting a sixth pivotal axis.

7. Apparatus according to claim 6 wherein at least the fourth and fifth pivotal axes are intermediate the first and sixth pivotal axes.

8. Apparatus according to claim 6 wherein the fourth pivotal axis is intermediate the fifth and sixth pivotal axes.

References Cited in the file of this patent

UNITED STATES PATENTS

| 691,848 | Edwards | Jan. 28, 1902 |
| 1,937,135 | Wood | Nov. 28, 1933 |
| 2,618,449 | Kohler | Nov. 18, 1952 |
| 2,631,837 | Robinson et al. | Mar. 17, 1953 |